US008941853B2

(12) United States Patent
Higashi (10) Patent No.: US 8,941,853 B2
(45) Date of Patent: Jan. 27, 2015

(54) IMAGE FORMING APPARATUS, METHOD FOR CONTROLLING THE SAME, AND STORAGE MEDIUM

(71) Applicant: Canon Kabushiki Kaisha, Tokyo (JP)

(72) Inventor: Hidenori Higashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/956,749

(22) Filed: Aug. 1, 2013

(65) Prior Publication Data

US 2014/0036292 A1 Feb. 6, 2014

(30) Foreign Application Priority Data

Aug. 6, 2012 (JP) ................. 2012-174332

(51) Int. Cl.
*G06F 15/00* (2006.01)
*H04N 1/00* (2006.01)
*G06K 15/00* (2006.01)
*G06F 9/50* (2006.01)

(52) U.S. Cl.
CPC ........ *H04N 1/00896* (2013.01); *G06K 15/4055* (2013.01); *G06K 15/406* (2013.01); *H04N 1/00891* (2013.01); *H04N 1/00952* (2013.01); *G06F 9/5094* (2013.01); *H04N 2201/0091* (2013.01)
USPC ........................................ 358/1.13

(58) Field of Classification Search
CPC ............................. G06F 1/3293; G06F 1/3287
USPC .......................................... 358/1.13
See application file for complete search history.

(56) References Cited

U.S. PATENT DOCUMENTS

2011/0208986 A1* 8/2011 Soga ............................. 713/323

FOREIGN PATENT DOCUMENTS

JP 2010-160565 A 7/2010

* cited by examiner

*Primary Examiner* — Saeid Ebrahimi Dehkordy
(74) *Attorney, Agent, or Firm* — Canon U.S.A., Inc. IP Division (57) ABSTRACT

An image forming apparatus includes a main control unit including a plurality of control units, and a sub control unit configured to respond to a request from an information processing apparatus via a network in substitution for the main control unit when the main control unit is being operated in a power saving state, wherein, in a case where the sub control unit receives a request to which the sub control unit cannot perform proxy response from the information processing apparatus, the main control unit determines a number of the control units for responding to the request among the plurality of control units and returns from the power saving state to a normal state using the control units the number of which is determined.

16 Claims, 7 Drawing Sheets

IMAGE FORMING APPARATUS, METHOD FOR CONTROLLING THE SAME, AND STORAGE MEDIUM

BACKGROUND OF THE INVENTION

1. Field of the Invention

The present invention relates to an image forming apparatus, a method for controlling the same, and a storage medium.

2. Description of the Related Art

In recent years, an image forming apparatus with a power saving mode has been commonly used. The image forming apparatus with the power saving mode realizes the power saving mode such that a power supplied to a main control unit for controlling the image forming apparatus is made smaller than the one supplied in a normal mode or is cut off when the image forming apparatus is in a non-standby state. A function called "proxy response" has been known in which a sub control unit realizes a network response in substitution for the main control unit with the power saving mode maintained. A resource available in the power saving mode is limited and it is impossible to perform all network responses by the proxy response. Japanese Patent Application Laid-Open No. 2010-160565, for example, discusses a technique which measures the amount of work performed by each CPU in a system including a plurality of central processing units (CPU) to predict the usage rate of each CPU based on the measured amount of work. If a CPU expected to be in an idle state exists, the technique realizes a scheduler function to save power by reducing the supply of power to the CPU.

In the technique discussed in Japanese Patent Application Laid-Open No. 2010-160565, if it is impossible to perform the network response using the proxy response function in a power saving state, a controller returns from the power saving mode to a standby state and starts monitoring the load state of a system. After that, a measurement time for measuring a load on a specific CPU is needed and a clock cannot be switched unless the measurement time elapses. For this reason, even though the load on the specific CPU is zero during the measurement time, the clock to the specific CPU cannot be switched, resultantly causing a problem that a wasteful power is consumed during the time for measuring the load on the specific CPU. Even in a case where the network response is ended in a standby state of the controller and then transition is performed to the power saving mode, the load on the CPU also needs to be measured to make it impossible to quickly transition the state, which consumes a wasteful power.

SUMMARY OF THE INVENTION

The present invention is directed to an image forming apparatus and a method for controlling the image forming apparatus capable of performing network response by causing a controller to wake up with as a small power as possible even if it is impossible to perform the network response using the proxy response function and to quickly transition to the power saving mode after the network response.

According to an aspect of the present invention, an image forming apparatus includes a main control unit including a plurality of control units, and a sub control unit configured to respond to a request from an information processing apparatus via a network in substitution for the main control unit when the main control unit is being operated in a power saving state, wherein, in a case where the sub control unit receives a request to which the sub control unit cannot perform proxy response from the information processing apparatus, the main control unit determines a number of the control units for responding to the request among the plurality of control units and returns from the power saving state to a normal state using the control units the number of which is determined.

Further features of the present invention will become apparent from the following detailed description of exemplary embodiments with reference to the attached drawings.

DESCRIPTION OF THE EMBODIMENTS

An exemplary embodiment of the present invention is described below with reference to the accompanying drawings.

Figure 1:
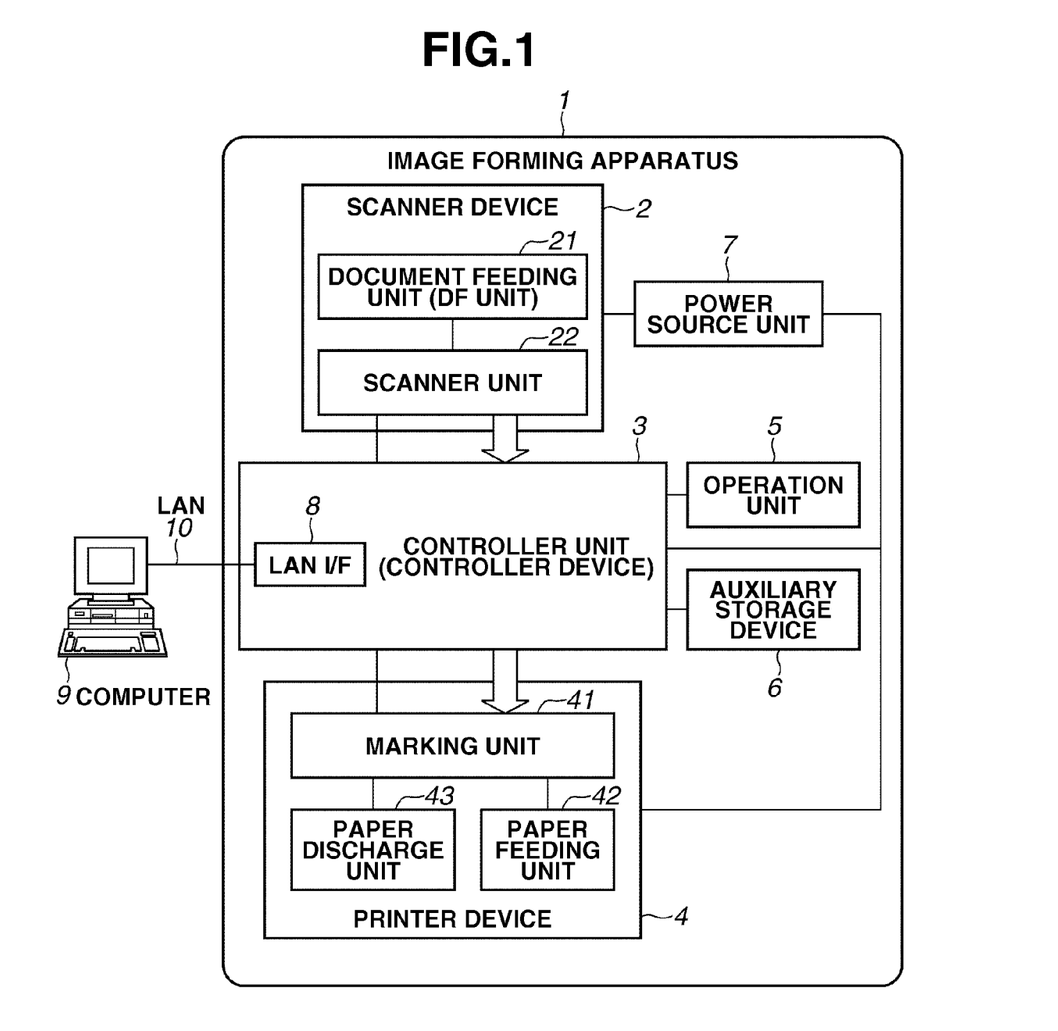
FIG. 1 is a block diagram illustrating an example of an internal configuration of an image forming apparatus.

FIG. 1 is a block diagram illustrating an example of an internal configuration of an image forming apparatus 1 communicable via a network.

The image forming apparatus 1 includes a scanner device 2, a controller unit 3, a printer device 4, an operation unit 5, an auxiliary storage device 6, and a power source unit 7.

The scanner device 2 optically reads an image from a document and converts the image into a digital image.

The printer device 4 outputs the digital image to a paper device.

The operation unit 5 is an input device of the image forming apparatus 1. A user operates the operation unit 5 to control the image forming apparatus 1.

The auxiliary storage device 6 stores the digital image and a control program.

The power source unit 7 controls the power supplied to the scanner device 2, the controller unit 3, and the printer device 4.

The controller unit 3 is connected to the scanner device 2, the printer device 4, the operation unit 5, the auxiliary storage device 6, and the power source unit 7, and issues instructions to each module to execute jobs on the image forming apparatus 1.

A local area network (LAN) interface (I/F) 8 is an I/F for connecting the image forming apparatus 1 to a LAN 10 via a network.

A computer 9 is an information processing apparatus configured to transfer and receive the digital image to and from the image forming apparatus 1 via the LAN 10 to provide jobs for the image forming apparatus 1, and issue instructions to devices.

The LAN 10 is connected to the controller unit 3 via the LAN I/F 8.

The scanner device 2 includes a document feeding unit 21 which can automatically and sequentially change a document bundle and a scanner unit 22 which optically scans the document and converts an image into the digital image, and transmits the image data converted by the scanner unit 22 to the controller unit 3.

The printer device 4 includes a marking unit 41 for printing image data onto the fed paper, a paper feeding unit 42 for sequentially feeding paper one by one from a paper bundle, and a paper discharge unit 43 for discharging printed paper.

In the above description, the image forming apparatus 1 is a multifunction peripheral (MFP) with a print function and a scanner function, however, the image forming apparatus 1 is not limited to the MFP. The image forming apparatus 1 may be a single function peripheral (SFP) without a scanner function, for example.

Figure 2:
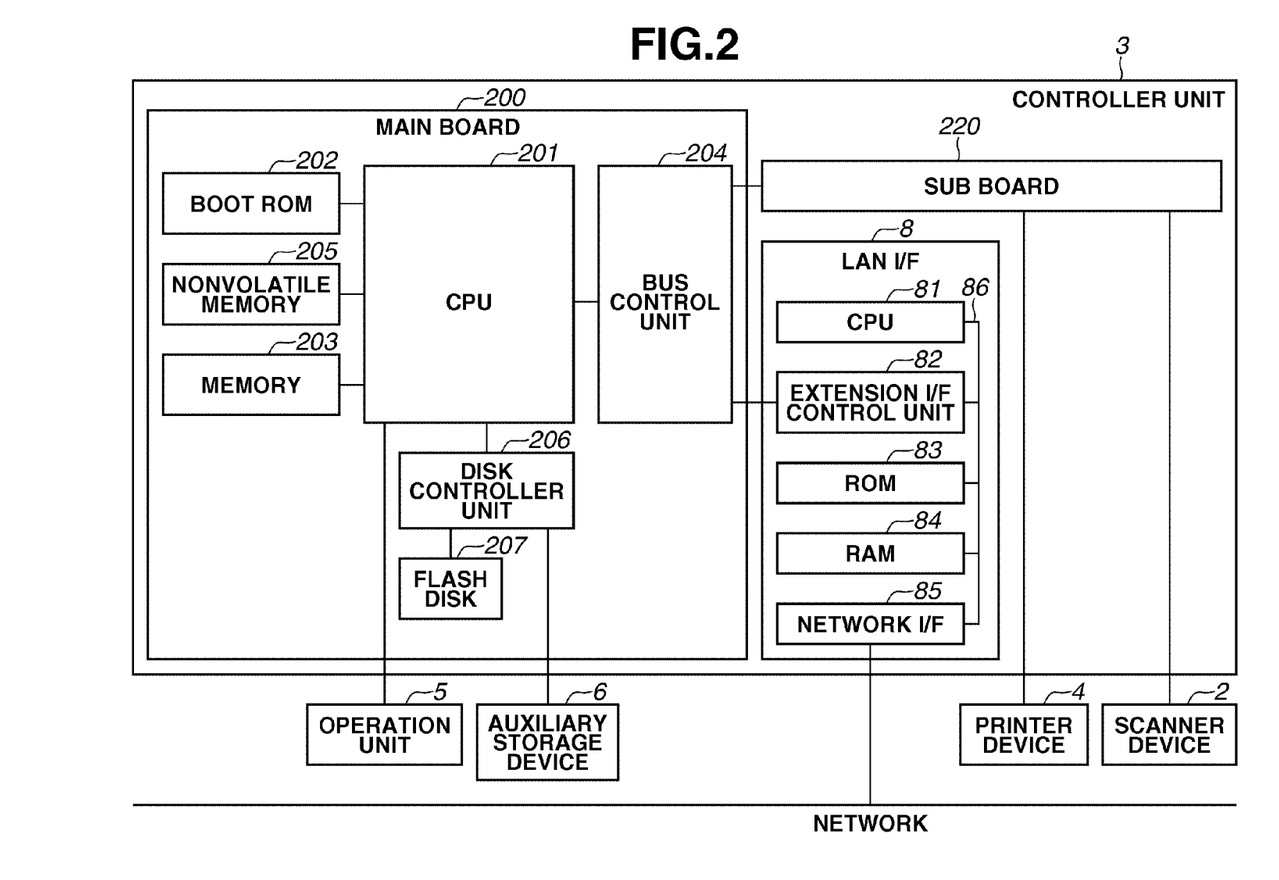
FIG. 2 is a block diagram illustrating an example of a hardware configuration of a controller unit of the image forming apparatus.

FIG. 2 is a block diagram illustrating an example of a hardware configuration of the controller unit 3 of the image forming apparatus 1.

The controller unit 3 includes a main board 200 and a sub board 220.

The main board 200 is a general purpose CPU system including a CPU 201, a boot read-only-memory (ROM) 202, a memory 203, a bus control unit 204, a nonvolatile memory 205, a disk controller unit 206, a flash disk 207, and a LAN I/F 8. The main board 200 is connected outside to the operation unit 5 and the auxiliary storage device 6. The CPU 201 controls the entire main board 200 and sub board 220 based on the program stored in the memory 203.

The boot ROM 202 stores a boot program.

The memory 203 stores a control program which can be executed mainly by the CPU 201 and various settings. The memory 203 is used by the CPU 201 as a work memory.

The bus control unit 204 has a bridge function with an external bus.

The nonvolatile memory 205 can maintain stored data even if a power source is turned off.

The disk controller unit 206 controls the storage device such as the flash disk 207.

The flash disk 207 is a storage device which is formed of a semiconductor device and is comparatively small in capacity.

The LAN I/F 8 is an interface for connecting the controller unit 3 to external devices via a network.

The sub board 220 includes a relatively small general-purpose CPU system and an image processing hardware, and executes a real-time digital image processing.

The ROM 83 stores a control program which can be executed by the CPU 81 and information about various settings.

The CPU 81 integrally controls various types of devices connected to a system bus 86 based on the program stored in the ROM 83.

The RAM 84 mainly functions as a main storage memory and a work area of the CPU 81.

The network I/F 85 enables the CPU 81 to communicate with a host computer on a network and the image forming apparatus.

The main board 200 is connected to the LAN I/F 8 via the bus control unit 204.

A software realized by the CPU 201 on the main board 200 controlling the program can exchange data with the LAN I/F 8 via the bus control unit 204. Similarly, the software realized by the CPU 81 on the LAN I/F 8 controlling the program can exchange data with the main board 200 via the bus control unit 204.

FIG. 2 is a block diagram of a simplified controller unit 3. For example, the CPU 201 actually includes hardware peripheral to the CPU such as a chip set, a bus bridge, and a clock generator.

The CPU 201 is an example of a main control unit. The CPU 81 is an example of a sub control unit.

Figure 3:
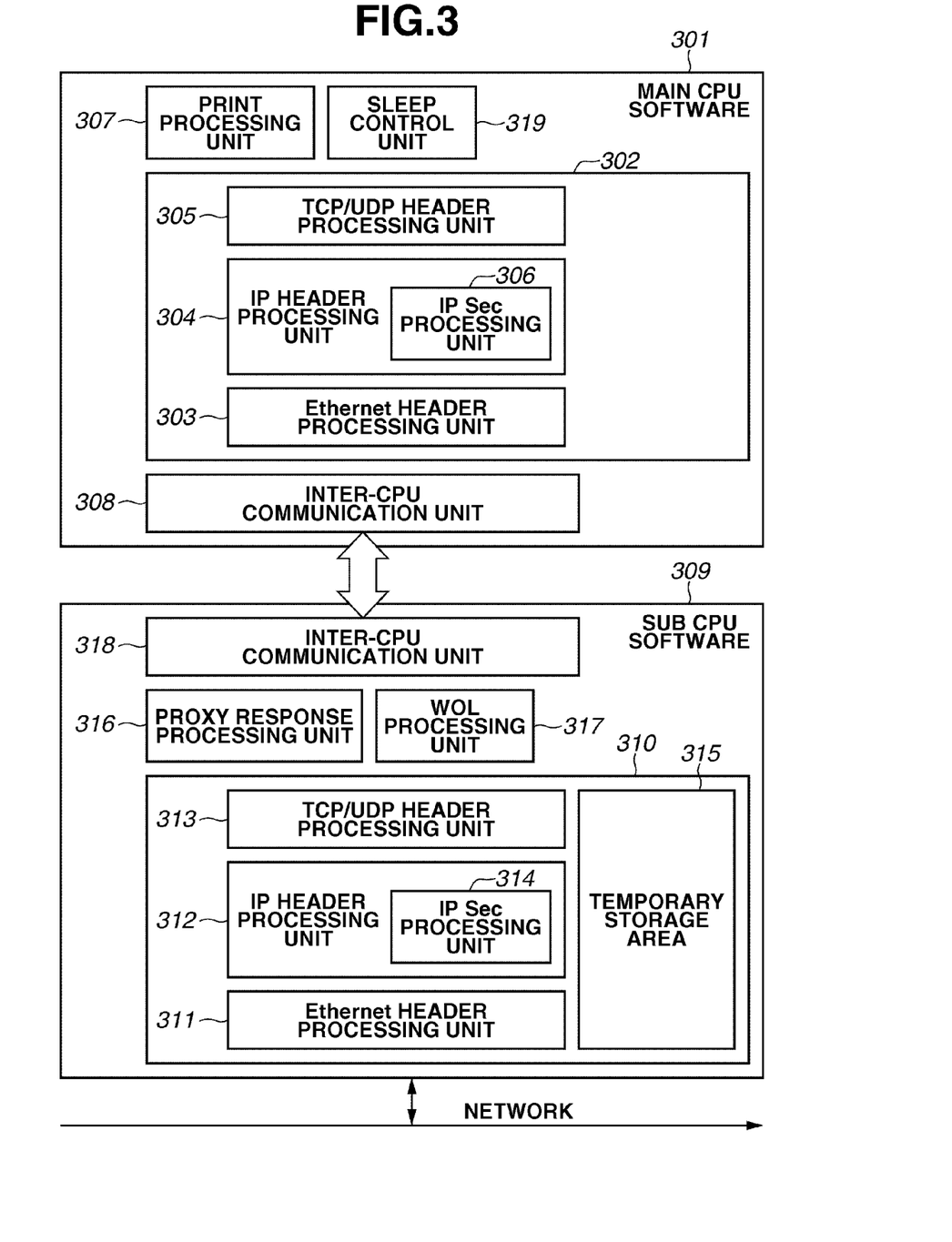
FIG. 3 is a block diagram illustrating an example of a software configuration of the controller unit of the image forming apparatus.

FIG. 3 is block diagram illustrating an example of a software configuration of the controller unit 3 of the image forming apparatus 1.

The software configuration of the controller unit 3 is roughly divided into a main CPU software 301 operated in a non-sleep state and a sub CPU software 309 operated in a sleep state.

First, the main CPU software 301 is described.

The main CPU software 301 is a software realized by the CPU 201 executing the program stored in the memory 203.

A sleep control unit 319 performs control related to transition from the normal state where power is supplied to both of the main board 200 and the LAN I/F 8 to the power saving state where the supply of power to the main board 200 is reduced.

The main CPU software 301 includes a protocol stack 302 including an Ethernet (registered trademark) header processing unit 303, an Internet Protocol (IP) header processing unit 304, and a transmission control protocol (TCP)/user datagram protocol (UDP) header processing unit 305.

An IP sec processing unit 306 is operated by a layer of the IP header processing unit 304 and performs an IP sec negotiation processing, a network packet IP sec processing, and management of security association (SA) required for the IP sec processing.

An inter-CPU communication unit 308 transmits and receives data to and from the sub CPU software 309 of the LAN I/F 8 via the bus controller unit 204.

Next, the sub CPU software 309 is described below.

The sub CPU software 309 is a software realized by the CPU 81 executing the program stored in the ROM 83.

An inter-CPU communication unit 318 transmits and receives data to and from the main CPU software 301 via the bus controller unit 204.

The sub CPU software 309 includes a protocol stack 310 including an Ethernet header processing unit 311, an IP header processing unit 312, and a TCP/UDP header processing unit 313.

An IP sec processing unit 314 performs the IP sec processing of a reception packet and the management of SA.

The sub CPU software 309 includes a temporary storage area 315 for temporarily storing a network packet which the LAN I/F 8 receives from the computer 9 (hereinafter referred to as a reception packet) and SA information.

A proxy response processing unit 316 determines whether it is possible to respond to a reception packet received from the computer 9 only by the capacity of the CPU 81 without waking up the CPU 201. If it is determined that it is possible to respond, the proxy response processing unit 316 generates a response packet and controls the transmission of the packet to the computer 9.

The reception packet received form the computer 9 is an example of requests from the computer 9.

A wake on LAN (WOL) processing unit 317 determines whether a reception packet is a packet pattern to cause the CPU 201 to wake up. If the WOL processing unit 317 determines that the reception packet is the packet pattern to cause the CPU 201 to wake up, the WOL processing unit 317 causes the CPU 201 to wake up.

The sub CPU software 309 classifies the reception packet into three types; "discard," "transfer to the main CPU software 301," and "transmission by proxy response."

"Discard" indicates a negligible case such as a case where a reception packet is not addressed to the apparatus. If the sub CPU software 309 classifies a reception packet into "discard," the LAN I/F 8 does not subject the reception packet to any processing.

"Transfer to the main CPU software 301" indicates a case where the reception packet needs to be subjected to any processing, however, processing cannot be made only by the LAN I/F 8. If the sub CPU software 309 classifies the reception packet into "transfer to the main CPU software 301," the LAN I/F 8 transitions the main board 200 from the power saving state to the normal state and transfers the reception packet to the main CPU software 301.

"Transmission by proxy response" indicates a case where the LAN I/F 8 responds to the reception packet, generates a response packet, and transmits the packet to the computer 9. If a packet which the LAN I/F 8 transmits and receives to and from the computer 9 is an IP sec packet, the IP sec processing unit 314 controls transmission and reception between the LAN I/F 8 and the controller 3.

Figure 4:
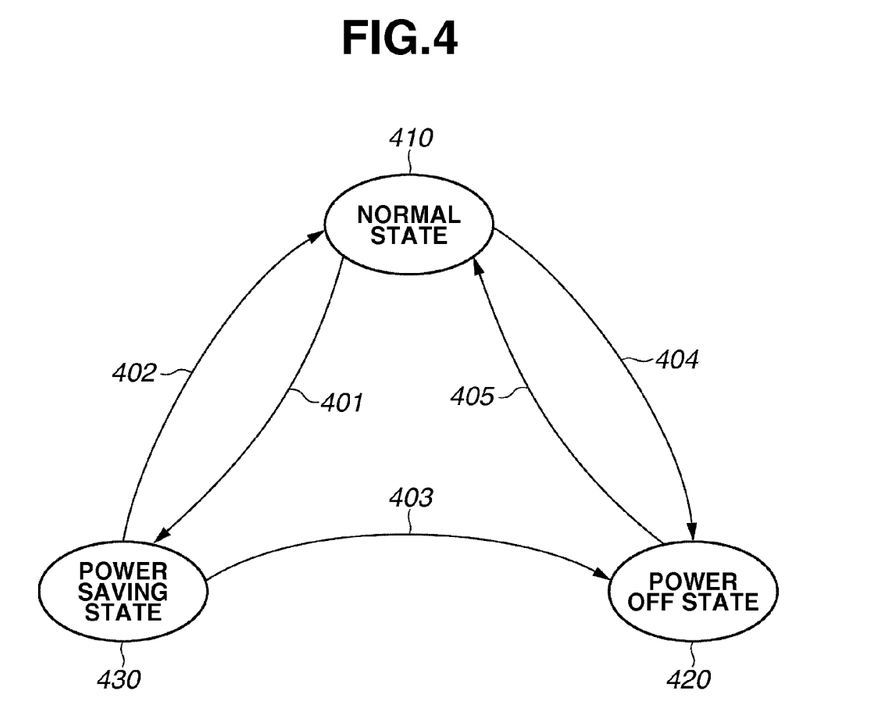
FIG. 4 is a diagram illustrating an example of transition of power state of the controller unit of the image forming apparatus.

FIG. 4 is a diagram illustrating an example of the transition of a power state of the controller unit 3 of the image forming apparatus 1.

The controller unit 3 in a normal state 410 is transitioned to a power saving state 430 due to the occurrence of an event to be transitioned to the power saving state 430 (refer to transition 401). A user's operation for transitioning to power saving and a timer are cited as examples of events to be transitioned to the power saving state 430.

The controller unit 3 in the power saving state 430 is transitioned to the normal state 410 due to the occurrence of an event to be transitioned to the normal state 410 (refer to transition 402). The reception of a network packet, a user's operation for transitioning to the normal state, and the timer are cited as examples of events to be transitioned to the normal state 410. The controller unit 3 in the power saving state 430 is transitioned to a power off state 420 due to the occurrence of an event to be transitioned to the power off state 420 (refer to 403). A user's operation for turning off a power supply is cited as an example of an event to be transitioned to the power off state 420.

The controller unit 3 in the power off state 420 is transitioned to the normal state 410 due to the occurrence of an event to be transitioned to the normal state 410 (refer to transition 405). A user's operation for turning off the power supply and the timer are cited as examples of events to be transitioned to the normal state 410.

The controller unit 3 in the normal state 410 is transitioned to the power off state 420 due to the occurrence of an event to be transitioned to the power off state 420 (refer to transition 404). A user's operation for power off and the timer are cited as examples of events to be transitioned to the power off state 420.

Figure 5:
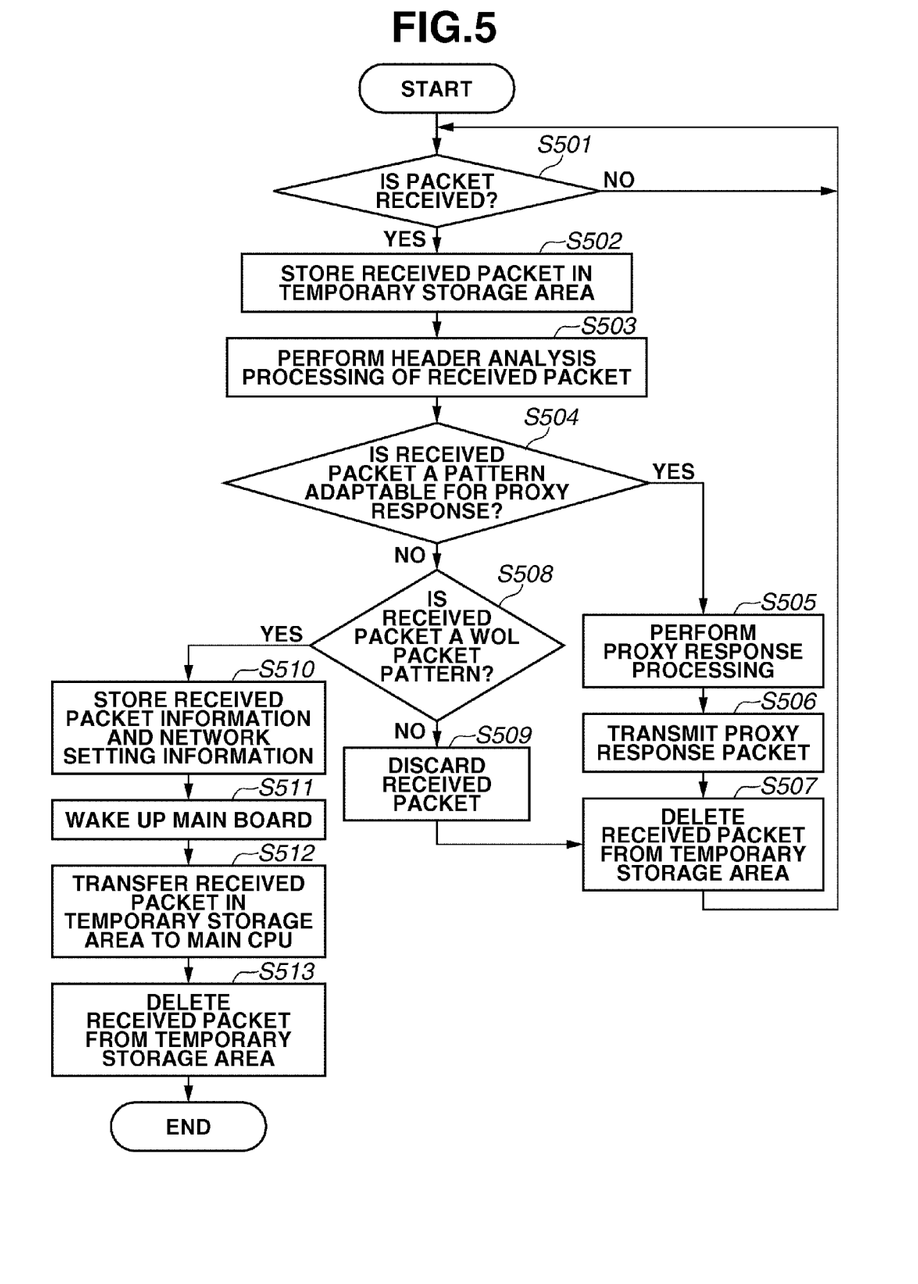
FIG. 5 is a flow chart illustrating an example of processing of a sub CPU of the image forming apparatus.

FIG. 5 is a flow chart illustrating an example of processing of the sub CPU software 309 in the power saving state 430.

A proxy response packet pattern and the WOL packet pattern are previously set to the sub CPU software 309 by the main CPU software 301.

In step S501, when the CPU 201 is transitioned to the sleep state and the control of packet processing is transitioned to the CPU 81, the protocol stack 310 waits for receiving the reception packet from the computer 9. When the protocol stack 310 receives the reception packet (YES in step S501), the processing proceeds to step S502.

In step S502, the protocol stack 310 stores the reception packet in the temporary storage area 315, and the processing proceeds to step S503.

In step S503, the protocol stack 310 transfers the reception packet stored in the temporary storage area 315 to the Ethernet header processing unit 311 and the IP header processing unit 312. Each analysis processing unit performs header analysis of the reception packet and removes the header portion. Then, the processing proceeds to step S504.

In step S504, the proxy response processing unit 316 determines whether the reception packet is a pattern adaptable for the proxy response based on the results of the header analysis and the analysis results of a PAYLOAD portion in step S503. If the proxy response processing unit 316 determines that the reception packet is a pattern adaptable for the proxy response (YES in step S504), the processing proceeds to step S505.

In step S505, the proxy response processing unit 316 generates the response packet. Then, the processing proceeds to step S506.

In step S506, the protocol stack 310 transmits the response packet to the computer 9. Then, the processing proceeds to step S507.

In step S507, the protocol stack 310 deletes the reception packet stored in the temporary storage area 315, and the processing proceeds to step S501 again.

If the proxy response processing unit 316 determines that the reception packet is a pattern inadaptable for the proxy response (NO in step S504), the processing proceeds to step S508.

In step S508, the WOL processing unit 317 determines whether the reception packet is a packet pattern which performs WOL processing on the CPU 201. If the WOL processing unit 317 determines that the reception packet is the packet pattern which does not perform WOL processing on the CPU 201 (NO in step S508), the processing proceeds to step S509.

In step S509, the WOL processing unit 317 discards the reception packet, and the processing proceeds to step S507.

If the WOL processing unit 317 determines that the reception packet is the packet pattern which has to perform WOL processing on the CPU 201 (YES in step S508), the processing proceeds to step S510.

In step S510, the WOL processing unit 317 stores the reception packet information and the network setting information in the nonvolatile memory 205, and the processing proceeds to step S511. The reception packet information refers to the protocol information of the reception packet, for example. The network setting information refers to information about communication speed of a network and information as to whether a packet is encrypted, for example.

The reception packet information and the network setting information are examples of processing load information.

In step S511, the WOL processing unit 317 causes the main board 200 to wake up via the inter-CPU communication unit 318, and the processing proceeds to step S512.

In step S512, the sub CPU software 309 transfers the reception packet stored not in the WOL processing unit 317 but in the temporary storage area 315 to the main CPU software 301, and the processing proceeds to step S513. This is because the transfer of the reception packet in which a header portion in the WOL processing unit 317 is removed disables the protocol stack 302 of the main CPU software 301 to execute processing.

In step S513, the protocol stack 310 deletes the reception packet stored in the temporary storage area 315. After the reception packet stored in the temporary storage area 315 is deleted, the processing by the CPU 81 is ended.

Figure 6:
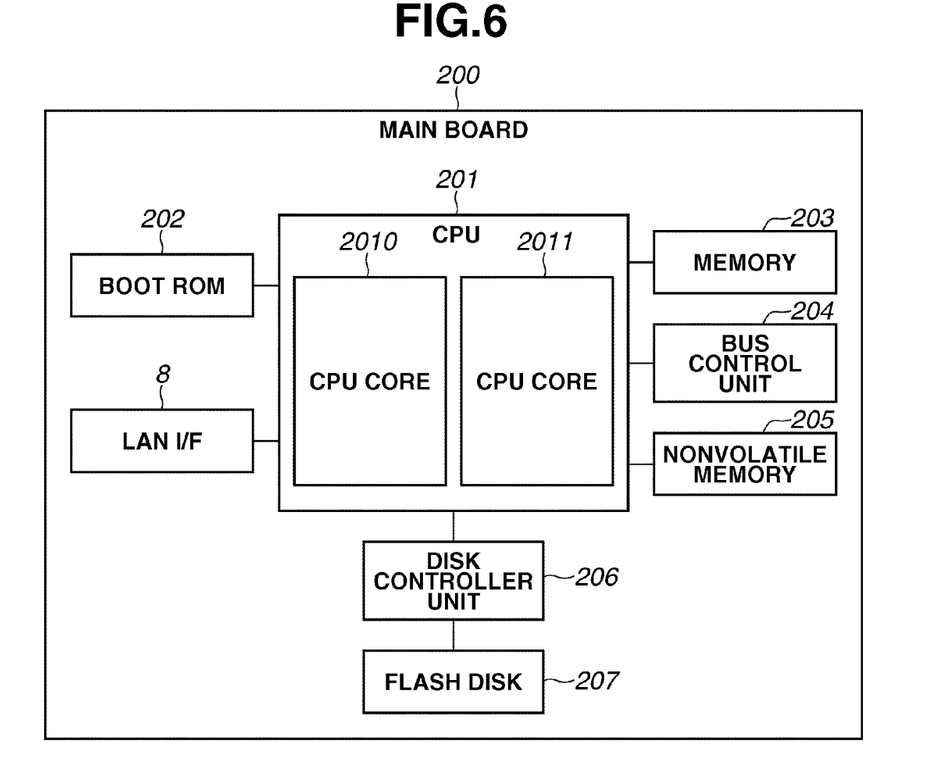
FIG. 6 is a block diagram illustrating an example of a configuration of a main board in the controller unit of the image forming apparatus.

FIG. 6 is a block diagram illustrating an example of a configuration of the main board 200 in the controller unit 3 of the image forming apparatus 1.

A power state of the controller unit 3 of the image forming apparatus 1 in transitioning from the power saving state 430 to the normal state 41, by receiving the reception packet from the computer 9 is described below with reference to FIG. 6.

In the power saving state 430, the LAN I/F 8 and the memory 203 in the controller unit 3 are mainly energized. In a self-refresh state, the memory 203 stores memory contents at the time of the controller unit 3 starting the transition from the normal state 410 to the power saving state 430.

If the CPU 81 on the LAN I/F 8 receives the reception packet from the computer 9 in the power saving state 430, the CPU 81 determines whether it is possible to respond with the power saving state 430 maintained.

If the CPU 81 determines that it is possible to respond, the CPU 81 generates a response packet for the reception packet and transmits the response packet to a transmission source such as the computer 9.

If the CPU 81 determines that it is impossible to respond, the CPU 81 causes the entire main board 200 to wake up to reset CPU cores 2010 and 2011.

The reset CPU cores 2010 and 2011 execute a boot program such as a basic input output system (BIOS) and various types of processing for transition from the power saving state 430 to the normal state 410.

After the CPU cores 2010 and 2011 complete the various types of processing, the CPU cores 2010 and 2011 jump to a command area of the memory 203 storing a state before transition from the normal state 410 to the power saving state 430, and end the processing of the boot program.

After that, the CPU cores 2010 and 2011 perform various types of processing for transition to the normal state 410 by the OS to bring all devices on the main board 200 into a usable state.

The CPU cores 2010 and 2011 respond to the reception packet to which the CPU cores 2010 and 2011 cannot respond with the power saving state 430 maintained. After the response is completed, the CPU cores 2010 and 2011 are transitioned again to the power saving state 430.

The CPU cores 2010 and 2011 are merely examples of a plurality of control units. In the present exemplary embodiment, two CPU cores are used, however, the number of the CPU cores to be used may be two or more.

Figure 7:
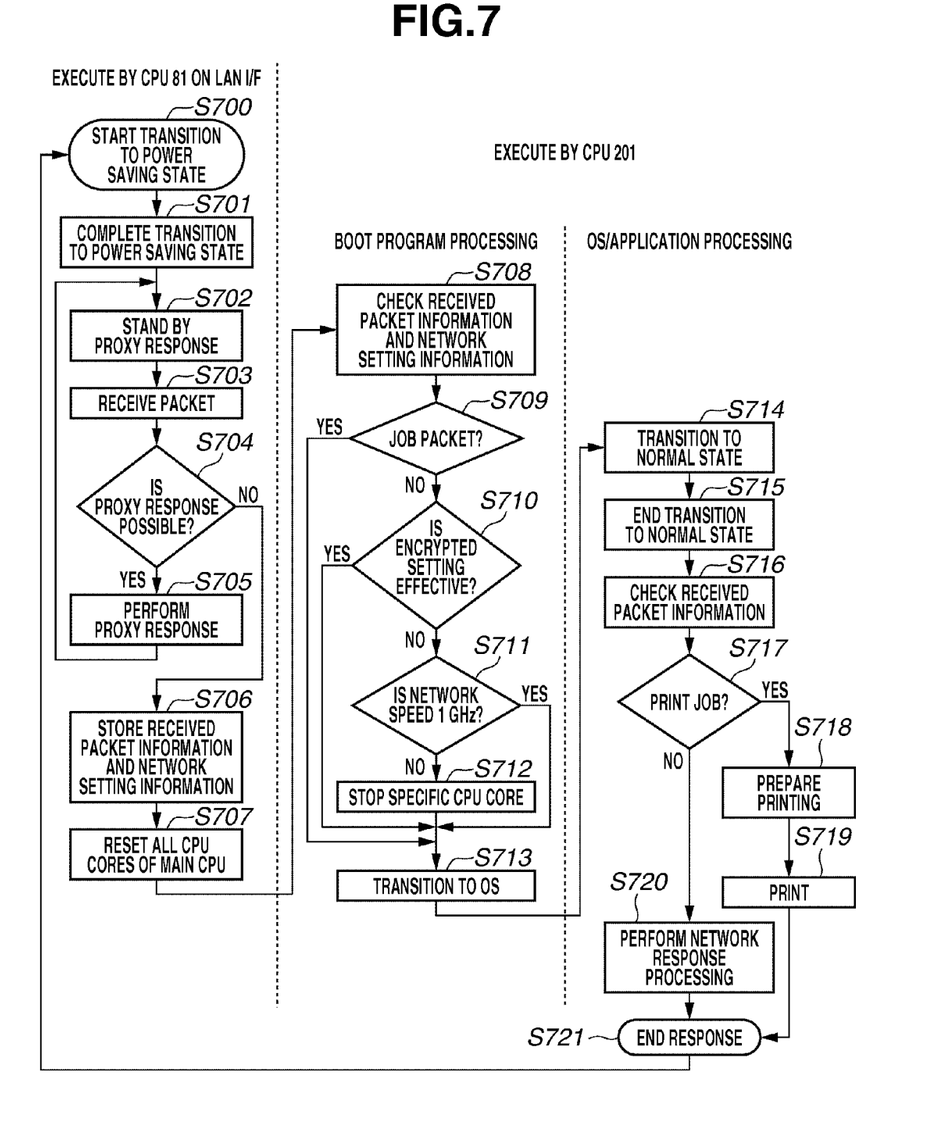
FIG. 7 is a flow chart illustrating an example of processing according to an exemplary embodiment of the present invention.

FIG. 7 is a flow chart illustrating an example of processing according to the present exemplary embodiment.

The processing from step S700 to step S707 is executed by the CPU 81 based on the program stored in the ROM 83 of the LAN I/F 8.

In step S700, the CPU 81 starts transition to the power saving state 430 by a user's operation or the timer, and then the processing proceeds to step S701.

In step S701, the CPU 81 completes transition to the power saving state 430, and then the processing proceeds to step S702.

In step S702, the CPU 81 is brought into a proxy response standby state in which a packet can be received from the computer 9 in the power saving state 430, and the processing proceeds to step S703.

In step S703, the CPU 81 receives the packet from the computer 9 in the power saving state 430, and then the processing proceeds to step S704.

In step S704, the CPU 81 determines whether the LAN I/F 8 can perform proxy response to the reception packet. If the CPU 81 determines that the LAN I/F 8 can perform proxy response (YES in step S704), the processing proceeds to step S705. If the CPU 81 determines that the LAN I/F 8 cannot perform proxy response (NO in step S704), the processing proceeds to step S706.

In step S705, the CPU 81 responds to the reception packet with the power saving state 430 maintained. After the response, the CPU 81 transitions to the proxy response standby state in step S702 for the next packet reception.

In step S706, the CPU 81 stores the reception packet information and the network setting information in the nonvolatile memory 205, and the processing proceeds to step S707. The reception packet information refers to the protocol information of the reception packet, for example. The network setting information refers to information about communication speed of a network and information as to whether a packet is encrypted, for example. In step S707, the CPU 81 causes the entire main board 200 to wake up to reset CPU cores 2010 and 2011.

The processing from step S708 to step S713 is executed by the CPU 201 based on the boot program stored in the memory 203 of the main board 200. In step S708, the CPU 201 checks the reception packet information and the network setting information stored in the nonvolatile memory 205 in step S706, and the processing proceeds to step S709. In step S709, the CPU 201 determines whether the reception packet is a job packet (for example, a packet of a print job) based on the reception packet information. If the CPU 201 determines that the reception packet is the job packet (YES in step S709), CPU power is presumed necessary, so that the processing proceeds to step S713 to perform response by all the CPU cores (the CPU cores 2010 and 2011).

In step S713, after the boot program is stopped, the CPU 201 performs processing for transition from the boot program to the OS, and then the processing proceeds to step S714.

On the other hand, if the CPU 201 determines that the reception packet is not the job packet (NO in step S709), the processing proceeds to step S710.

In step S710, the CPU 201 determines whether the reception packet is encrypted based on the network setting information.

If the CPU 201 determines that the reception packet is encrypted (YES in step S710), a CPU power is presumed necessary for encryption and composition, so that the processing proceeds to step S713 to perform response by all the CPU cores.

On the other hand, if the CPU 201 determines that the reception packet is not encrypted (NO in step S710), the processing proceeds to step S711.

In step S711, the CPU 201 checks network speed setting based on the network setting information. If the CPU 201 determines that the network is set to a high speed (YES in step S711), a large CPU power is presumed necessary for the network processing, so that the processing proceeds to step S713 to perform response by all the CPU cores. In the present exemplary embodiment, a network setting of 1 GHz or higher is taken as a high speed setting as an example, however, the network setting is not limited to the above setting. For example, the CPU 201 may determine the network speed set to high speed for each CPU power. The CPU 201 may set a setting value input from the operation unit 5 to a threshold value.

On the other hand, if the CPU 201 determines that the network is set not to a high speed (NO in step S711), the processing proceeds to step S712.

A large CPU power can be presumed unnecessary in step S712, so that the CPU 201 determines the number of the CPU cores required for network response among a plurality of the CPU cores, stops stoppable CPU cores, and then the processing proceeds to step S713.

The processing from step S714 to step S721 is executed by the CPU 201 based on the OS or an application.

In step S714, the CPU core, which is under the control of the OS and is not stopped, executes processing for transition to the normal state 410 by the OS. Then, the processing proceeds to step S715.

In step S715, the CPU core completes transition to the normal state 410 by the OS, and the processing proceeds to step S716.

In step S716, the CPU 201 checks the reception packet information stored in the nonvolatile memory 205 in step S706, and the processing proceeds to step S717.

In step S717, the CPU 201 determines whether the reception packet is a print job. If the reception packet is the print job (YES in step S717), the processing proceeds to step S718. If the reception packet is not the print job (NO in step S717), the processing proceeds to step S720.

In step S718, the CPU 201 performs a print preparation processing for the image forming apparatus 1 executing the print job, and then the processing proceeds to step S719.

In step S719, the CPU 201 causes the image forming apparatus 1 to perform print processing, and the processing proceeds to step S721.

In step S720, the CPU 201 performs a network response processing, and the processing proceeds to step S721.

In step S721, the CPU 201 completes all of the response processing operations, starts transition to the power saving state, and instructs the CPU 81 to response to the processing in step S700.

Although the present exemplary embodiment describes a configuration about a prompt transition to the power saving state according to the completion of the network response processing in step S720 and the print processing in step S719, the transition to the power saving state is allowed not promptly but after a predetermined time elapses.

The present exemplary embodiment can be also realized by executing the following processing. Specifically, the processing is such that software (program) for realizing the functions of the above exemplary embodiment is supplied to a system or an apparatus via a network or various storage media and a computer of the system or the apparatus (or a CPU or an MPU) reads and executes the program.

According to the processing of the above exemplary embodiment, even if it is impossible to perform the network response using the proxy response, the controller is caused to wake up with as small power as possible to perform the network response, which enables a prompt transition to the power saving mode after the network response.

A preferable embodiment of the present invention is described above, however, the present exemplary embodiment is not limited to a specific exemplary embodiment, but can be changed to various forms within the range of the gist of the present invention according to claims.

According to the present invention, even if it is impossible to perform the network response using the proxy response, the controller is caused to wake up with as small power as possible to perform the network response, which enables a prompt transition to the power saving mode after the network response.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-174332 filed Aug. 6, 2012, which is hereby incorporated by reference herein in its entirety.

What is claimed is:

1. An image forming apparatus comprising:
a multi-core CPU including a plurality of cores;
a receiving unit configured to receive a packet transmitted by an external apparatus on a network;
a shifting unit configured to shift a mode in which the image forming apparatus is operated from a first power mode, in which power is not supplied to the multi-core CPU, to a second power mode, in which power is supplied to the multi-core CPU, in a case where the packet received by the receiving unit is a specific type of packet; and
a determining unit configured to determine, out of the plurality of cores included in the multi-core CPU, a number of cores to operate based on the specific type of the packet received by the receiving unit in a case where the shifting unit shifts the mode in which the image forming apparatus is operated from the first power mode to the second power mode.

2. The image forming apparatus according to claim 1, wherein the determining unit determines the number of cores to operate based on a network setting of the image forming apparatus and the type of the packet received by the receiving unit.

3. The image forming apparatus according to claim 2, wherein the network setting includes an encryption setting.

4. The image forming apparatus according to claim 2, wherein the network setting includes a network speed setting.

5. The image forming apparatus according to claim 1, wherein the determining unit determines that all of the cores of the multi-core CPU are to operate in a case where the packet received by the receiving unit is a print job packet.

6. The image forming apparatus according to claim 1, wherein the mode of the image forming apparatus shifts from the second power mode to the first power mode in response to multi-core CPU's performance of a processing with respect to the packet received by the receiving unit.

7. An image forming apparatus comprising:
a multi-core CPU including a plurality of cores;
a receiving unit configured to receive a packet transmitted by an external apparatus on a network;

a shifting unit configured to shift a mode in which the image forming apparatus is operated from a first power mode, in which power is not supplied to the multi-core CPU, to a second power mode, in which power is supplied to the multi-core CPU, in a case where the packet received by the receiving unit is a specific type of packet; and a determining unit configured to determine, out of the plurality of cores included in the multi-core CPU, a number of cores not to operate based on the specific type of the packet received by the receiving unit in a case where the shifting unit shifts the mode in which the image forming apparatus is operated, from the first power mode to the second power mode.

8. The image forming apparatus according to claim 7, wherein the determining unit determines the number of cores not to operate based on a network setting of the image forming apparatus and the type of the packet received by the receiving unit.

9. The image forming apparatus according to claim 8, wherein the network setting includes an encryption setting.

10. The image forming apparatus according to claim 8, wherein the network setting includes a network speed setting.

11. The image forming apparatus according to claim 7, wherein the determining unit determines that the number of the core of the multi-core CPU not to operate is zero in a case where the packet received by the receiving unit is a print job packet.

12. The image forming apparatus according to claim 7, wherein a mode in which the image forming apparatus is operated shifts from the second power mode to the first power mode in response to multi-core CPU's performance of a processing with respect to the packet received by the receiving unit.

13. A method of controlling an image forming apparatus, the image forming apparatus having a multi-core CPU including a plurality of cores, the method comprising:

receiving a packet transmitted by an external apparatus on a network;

shifting a mode in which the image forming apparatus is operated from a first power mode, in which power is not supplied to the multi-core CPU, to a second power mode, in which power is supplied to the multi-core CPU, in a case where the packet received is a specific type of packet; and determining, out of the plurality of cores included in the multi-core CPU, a number of cores to operate based on the specific type of the packet received by the receiving unit in a case where the shifting unit shifts the mode in which the image forming apparatus is operated from the first power mode to the second power mode.

14. A non-transitory computer-readable storage medium storing a program for causing a computer to execute the method for controlling the image forming apparatus according to claim 13.

15. A method of controlling an image forming apparatus, the image forming apparatus having a multi-core CPU including a plurality of cores, the method comprising:

receiving a packet transmitted by an external apparatus on a network;

shifting a mode in which the image forming apparatus is operated from a first power mode, in which power is not supplied to the multi-core CPU, to a second power mode, in which power is supplied to the multi-core CPU, in a case where the packet received is a specific type of packet; and determining, out of the plurality of cores included in the multi-core CPU, a number of cores not to operate based on the specific type of the packet received by the receiving unit in a case where the shifting unit shifts the mode in which the image forming apparatus is operated, from the first power mode to the second power mode.

16. A non-transitory computer-readable storage medium storing a program for causing a computer to execute the method for controlling the image forming apparatus according to claim 15.

* * * * *